United States Patent [19]
Holdridge et al.

[11] Patent Number: 4,979,342
[45] Date of Patent: Dec. 25, 1990

[54] TRANSPARENCY ASSEMBLY AND METHOD FOR USING IT

[75] Inventors: David W. Holdridge, Fullerton; Richard D. Hopkins, Fountain Valley, both of Calif.

[73] Assignee: Swedlow, Inc., Garden Grove, Calif.

[21] Appl. No.: 275,765

[22] Filed: Nov. 23, 1988

[51] Int. Cl.$^5$ .............................................. E06B 7/12
[52] U.S. Cl. ........................... 52/171; 52/173 R; 52/304; 52/208
[58] Field of Search ............... 52/173 R, 204, 202, 52/171, 788, 202, 203, 207, 208, 304, 308; 428/34

[56] References Cited

U.S. PATENT DOCUMENTS

| | | |
|---|---|---|
| 1,853,317 | 4/1932 | Packer . |
| 2,358,485 | 9/1944 | Warren et al. . |
| 2,473,616 | 6/1949 | Stephenson . |
| 2,575,757 | 11/1951 | Hardy . |
| 2,730,777 | 1/1956 | Koriagin ............... 52/208 |
| 2,784,926 | 3/1957 | Bonza et al. . |
| 2,795,018 | 6/1957 | Shaw ...................... 52/304 |
| 2,894,294 | 7/1959 | Prescott ................. 52/304 |
| 3,192,575 | 7/1965 | Rosenau, Jr. et al. . |
| 3,259,345 | 7/1966 | Martignoni et al. . |
| 3,429,530 | 2/1969 | Hertel . |
| 3,452,553 | 7/1969 | Dershin et al. . |
| 3,572,615 | 3/1971 | Firestone . |
| 3,735,553 | 5/1973 | Houser ................ 52/304 X |
| 4,358,182 | 11/1982 | Hayes et al. . |
| 4,504,341 | 3/1985 | Radzwill et al. . |

Primary Examiner—David A. Scherbel
Assistant Examiner—Creighton Smith
Attorney, Agent, or Firm—Pretty, Schroeder, Brueggemann & Clark

[57] ABSTRACT

An optical transparency assembly suitable for use in applications where substantial pressure, temperature and humidity differentials between the air spaces on its opposite sides must be withstood, with one of its external surfaces maintaining a precise contour. One embodiment of the transparency assembly meets these requirements by including two separate transparent panels joined together at their peripheries with a narrow air space defined between them, with a unit being provided for conditioning the air in this narrow space such that it has a pressure, temperature and humidity substantially the same as that in the space adjacent the surface whose contour is to be maintained. Pressure, temperature and humidity gradients across one panel of the transparency assembly are minimized and that panel's contour is thereby precisely maintained. In another embodiment, the air conditioning unit is replaced by a simple bladder located in the adjacent space and having an interior that communicates with the narrow space between the two panels. In this second embodiment, the panel whose contour is to be maintained is formed of a material having a high thermal conductivity and having low expansion due to moisture absorption.

16 Claims, 2 Drawing Sheets

TRANSPARENCY ASSEMBLY AND METHOD FOR USING IT

BACKGROUND OF THE INVENTION

This invention relates generally to optical transparencies, and, more particularly, to optical transparencies adapted for use in applications such as in aircraft where they are subject to substantial pressure, temperature and humidity variations in the air spaces on their opposite sides.

Optical transparencies intended for use in aircraft applications, particularly in military aircraft, often are exposed to extreme environmental conditions. The transparency's outside surface frequently is exposed to extremes in pressure, temperature and humidity, yet the air space adjacent the transparency's inside surface must remain suitable for reasonable human comfort. As a consequence, the transparency must be capable of withstanding large pressure, temperature and humidity differentials, all of which can create substantial internal stresses that will tend to bend or warp the transparency out of its desired contour.

Some transparency applications call for at least one of the transparency's surfaces to continuously maintain a prescribed contour, to very precise tolerances. This has sometimes been achieved by providing the transparency with sufficient structural strength to minimize its bending due to the stress factors discussed above. This has generally required the transparency to have a substantial thickness and, thus, substantial weight. In many cases, this weight has been considered excessive. In addition, the transparency bending that can occur even with this substantial thickness and weight can be more than is desired.

It should therefore be appreciated that there is a need for a transparency having an external surface that can maintain its desired contour despite substantial variations in pressure, temperature and humidity in the air spaces on its opposite sides, without the need for excessive structural size and strength and excessive weight. The present invention fulfills this need.

SUMMARY OF THE INVENTION

The present invention is embodied in an optical transparency assembly, and related method for using it, having an external surface that can maintain a desired contour despite substantial variations in the pressure, temperature and humidity in the air spaces on the transparency's opposite sides, without the need for excessive structural size and strength. The transparency assembly includes first and second transparent panels, each having a prescribed unstressed contour, along with means for joining together the two panels at their peripheries. The contours of the two panels are selected such that a narrow space is defined between them, except at their peripheries. In accordance with the invention, the assembly further includes means for conditioning the narrow space defined between the two panels such that it has a pressure, temperature and humidity substantially the same as that of the air space adjacent the first of the two panels. Pressure, temperature and humidity gradients across the first panel are thereby minimized and the panel maintains its prescribed contour despite substantial variations in the pressure, temperature and humidity of the air spaces adjacent the transparency's opposite sides. The unstressed first panel, therefore, need not have a particularly high structural strength and can be relatively lightweight. In addition, the second panel, which is subject to substantial pressure, temperature and humidity gradients, also need not have a particularly high structural strength, because limited bending out of its nominal, unstressed contour can be tolerated.

In more detailed features of the invention, the conditioning means includes means for blowing air from the space adjacent to the first panel through the narrow space between the two panels. Means are also provided for regulating the pressure, temperature and humidity of the air being pumped through the narrow space to be substantially the same as that of the air in the space adjacent the first panel.

In an alternative embodiment of the invention, the means for conditioning the narrow space between the two panels can be eliminated and substituted by a balloon or bladder whose inside space communicates with the narrow space and whose outside space communicates with the space on the opposite side of the first panel. The narrow space and the inside space of the bladder are occupied by dessicated air or gas (e.g., nitrogen), to prevent moisture condensation on the inwardly-facing surfaces of the two panels. Since humidity differences could occur between the spaced on opposite sides of the first panel, that panel is preferably formed of a material that is either non-moisture absorptive (e.g., glass) or that will not swell with absorbed moisture.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENTS

Figure 1:
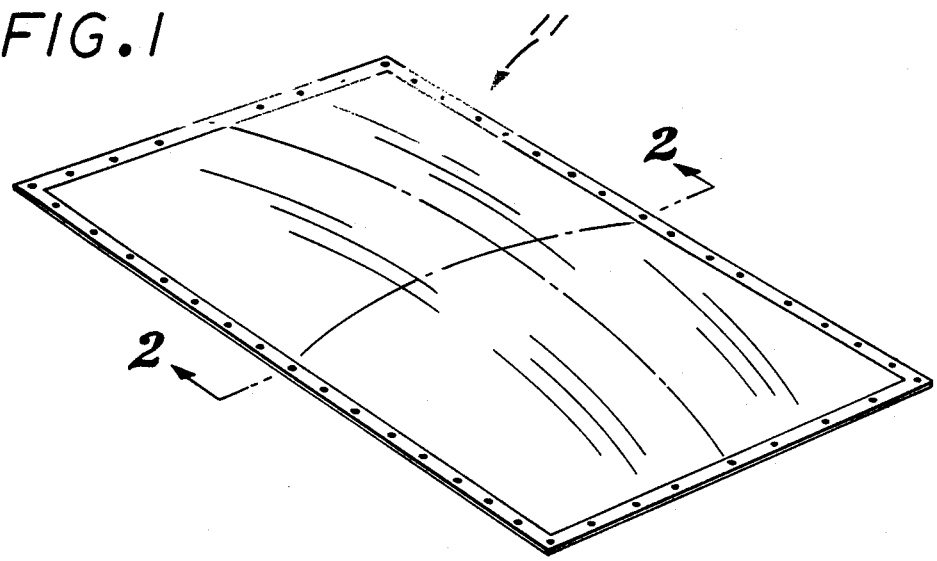
FIG. 1 is a perspective view of an optical transparency assembly in accordance with a first embodiment of the present invention.

With reference now to the drawings, there is shown a transparency assembly 11 adapted for installation into an aircraft. The assembly includes an inner transparent panel 13 and an outer transparent panel 15, along with a plurality of fasteners 17 for securing the outer peripheries of the two panels to the aircraft's frame 19. Both transparent panels are depicted as having substantially uniform thicknesses, with the inner panel being substantially flat and the outer panel being bowed outwardly. A narrow space 21 is thereby defined between the two panels. The two panels may be formed of any conventional material such as acrylic.

The aircraft carrying the transparency assembly 11 is expected to be flown in environments where severe variations can occur in the pressure, temperature and humidity of the outside air space 23 adjacent the transparency's outside surface 25. At the same time, however, the aircraft includes means (not shown in the drawings) for maintaining the pressure, temperature and humidity in the air space 27 on the inside cockpit area, i.e., adjacent the transparency's inside surface 29, suitable for reasonable human comfort.

Some uses of aircraft transparencies of this kind require that the transparency's inside surface 29 maintain a specific contour (e.g., flat) despite these substantial differences in the pressure, temperature and humidity of the respective outside and inside air spaces 23 and 27. In the past, this has typically been achieved by sizing the transparency to have sufficient structural strength to resist bending when subjected to the stresses caused by these environmental differentials. This solution, unfortunately, has added excessive weight to the aircraft.

In accordance with the invention, the transparency assembly 11 maintains the contour of its inside surface 29 substantially constant by using an air conditioning unit 31 for maintaining the air in the narrow space 21 between the respective inner and outer panels 13 and 15 at substantially the same pressure, temperature and humidity as is present in the air space 27 adjacent the transparency's inside surface. Pressure, temperature and humidity differentials across the inner panel and resulting stresses are thereby minimized, and the inner panel maintains its desired contour despite substantial difference between the pressure, temperature and humidity in the outside and inside air spaces 23 and 27.

More particularly, the air conditioning unit 31 includes a fan 33 for blowing air through inlet and outlet conduits 35 and 37 to and from the narrow space 21 defined between the inner and outer panels 13 and 15. Appropriately positioned temperature sensors 39 and 41 provide signals to the air conditioning unit indicating the temperature of the air being directed through the narrow space and the air located in the inside air space 27, respectively. Any detected difference between these two signals is used by the air conditioning unit to controllably adjust the temperature of the air being blown into the inlet conduit so as to minimize the temperature difference.

It is not believed necessary to monitor the pressure differential between the air being pumped through the narrow space 21 and the air located in the inside space 27, because any such differential would likely be minimal and affected only by the fan 33, whose characteristics are uniform and known. In addition, separate fans could be used for blowing air into and out of the narrow space, to further reduce the already small pressure differential across the inner panel.

Similarly, it is not believed necessary to monitor the humidities of the air being blown or of the air in the inside space 27, because they presumably are the same, at least if the temperatures of the two bodies of air are maintained substantially the same. If moisture condensation on the inwardly-facing surface 43 of the outer panel 15 is a problem, the air conditioning unit 31 can also function to partially dessicate the air being blown. The resulting humidity gradient across the inner panel's thickness will bring about limited stress and bending of the inner panel 13, which can be accounted for when establishing the inner panel's prescribed contour.

It will be appreciated that pressure, temperature and humidity differences between the inside air space 27 and the outside air space 23 will be withstood entirely by the outer panel 15. This outer panel need be sized to have sufficient structural strength to withstand the resulting stresses without bending to a point where the panel either fails or moves unduly close to the inner panel 13. This minimal constraint allows the outer panel to be sized significantly smaller than previous transparencies used in similar applications, and, in fact permits the combined size and weight of the outer and inner panels to be substantially smaller than that of prior transparencies of this kind.

Other advantages provided by the transparency assembly 11 of the invention are found in a reduced replacement cost following extended usage. Since only the outer panel 15 is exposed to significant internal stress and possible abrasion, only it need be replaced, with the inner panel 13 being reusable with multiple successive outer panels. In addition, in applications where an emergency egress of a pilot or other person must be provided for, the transparency assembly is believed to be sufficiently light in weight to allow its removal without explosive devices that otherwise would be required in transparencies of this kind.

Figure 2:
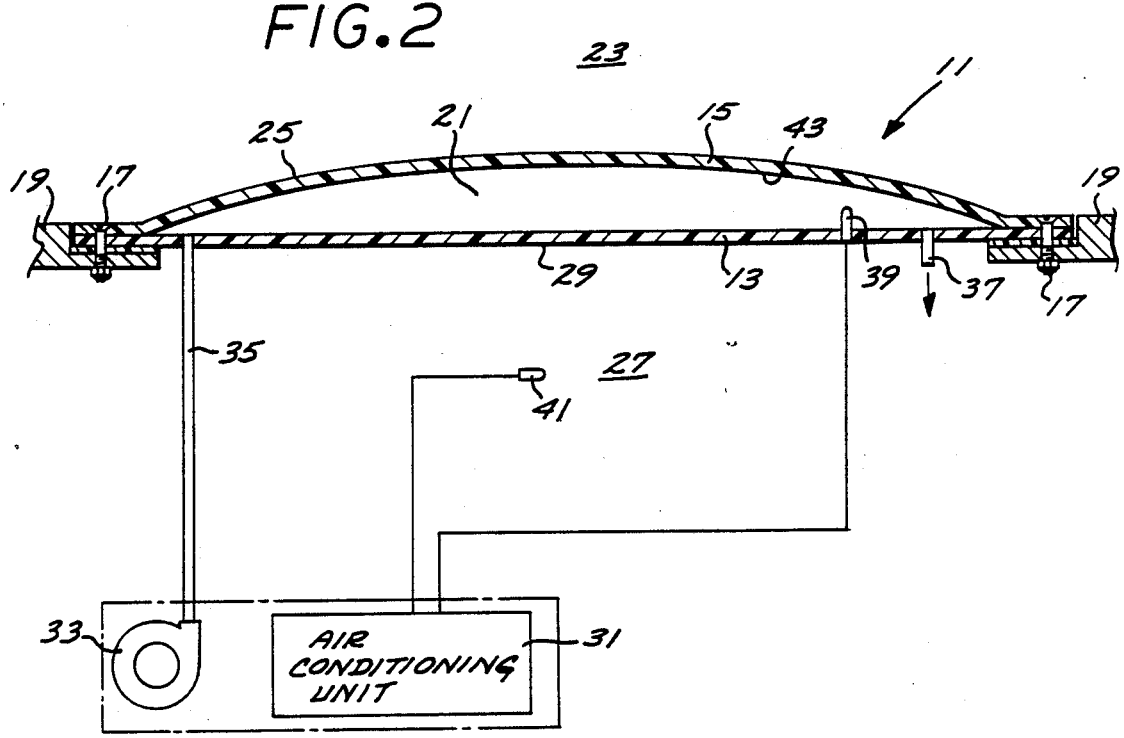
FIG. 2 is a side sectional of the transparency assembly, taken substantially in the direction of the arrows 2—2 in FIG. 1, and showing an air conditioning unit for maintaining the pressure, temperature and humidity of the narrow space in the middle of the transparency assembly substantially the same as that in the interior space.
Figure 3:
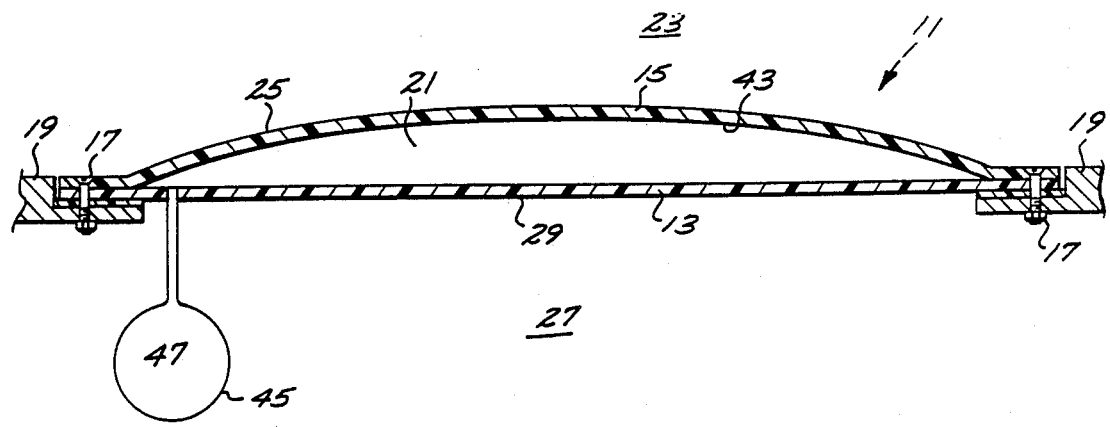
FIG. 3 is a side sectional view similar to FIG. 2, but of a second embodiment of the invention, in which the air conditioning unit is replaced by a bladder.

FIG. 3 depicts an alternative embodiment of a transparency in accordance with the invention. This embodiment is similar to that of FIGS. 1 and 2, except that it substitutes a simple flexible balloon or bladder 45 for the air conditioning unit 31, fan 33 and outlet conduit 37. The bladder is located in the inside space 27, and the space 47 inside the bladder communicates with the narrow space 21 between the two transparent panels 13 and 15 through the inlet conduit 35. The two spaces 21 and 47 are sealed and filled with dry air or nitrogen, to eliminate the possibility of moisture condensation.

Locating the bladder 45 in the inside space 27 ensures that space 27 and the spaces 21 and 47 are maintained substantially at the same pressures, which minimizes pressure differentials across the inner panel 13. It will be appreciated that, since the humidity of the narrow space 21 is maintained very low, a substantial humidity differential can arise between the narrow space 21 and the inside space 27. It also will be appreciated that, since the temperature of the narrow space 21 is not regulated to be substantially the same as that of the inside space 27, a substantial temperature differential can arise between those spaces. To prevent such humidity and temperature differentials from causing the inner panel to deflect excessively from its desired contour, the inner panel in this embodiment is formed of a material having high thermal conductivity and low expansion upon moisture absorption. Glass and some suitably-coated plastics can be used.

It should be appreciated from the foregoing description that the present invention provides an improved optical transparency assembly suitable for use in applications where substantial pressure, temperature and humidity differentials between the air spaces on its opposite sides must be withstood, and in which one of its surfaces must maintain a precise contour. One embodiment of the transparency assembly meets these requirements by including two separate transparent panels joined together at their peripheries, with a narrow air space defined between them and by providing means for conditioning the air in this narrow space such that it has a pressure, temperature and humidity substantially the same as that in the air space adjacent the surface whose contour is to be maintained. Pressure, temperature and humidity gradients across one panel of the transparency assembly are minimized and that panel's contour is thereby precisely maintained. In another embodiment, the air conditioning means is replaced by a bladder located in the adjacent space and having an interior that communicates with the narrow space between the two panels. In this second embodiment, the panel whose contour is to be maintained is formed of a material having a high thermal conductivity and having low expansion due to moisture absorption.

Although the present invention has been described in detail with reference to the presently preferred embodiment, those of ordinary skill in the art will appreciate that various modifications can be made without departing from the invention. Accordingly, the invention is defined only by the following claims.

We claim:

1. A transparency assembly adapted for use in separating a first air space from a second air space, wherein pressure, temperature and humidity differentials between the first and second air spaces are subject to substantial variations, the transparency assembly comprising:

a first transparent panel having a prescribed contour when unstressed;

a second transparent panel having a prescribed contour when unstressed;

means for joining together the first and second transparent panels at their peripheries and for orienting the joined panels such that first panel faces a first air space and the second panel faces a second air space, wherein the contours of the first and second panels are selected such that a narrow space is defined between the panels, except at their peripheries; and means for conditioning the narrow space defined between the first and second transparent panels such that the space has a pressure, temperature, and humidity substantially the same that of the first air space, whereby the pressure, temperature and humidity gradients across the first panel are minimized and the first panel maintains its prescribed contour despite substantial variations in the pressure, temperature and humidity of the respective first and second air spaces.

2. A transparency assembly as defined in claim 1, wherein the first transparent panel is substantially planar and has a substantially uniform thickness across substantially its entire surface.

3. A transparency assembly as defined in claim 1, wherein the means for conditioning includes means for blowing air from the first air space through the narrow space between the first and second transparent panels.

4. A transparency assembly as defined in claim 3, wherein the means for conditioning further includes means for regulating the temperature of the air pumped through the narrow space between the first and second transparent panels to be substantially the same as that of the second air space.

5. A transparency assembly as defined in claim 1, wherein the first transparent panel is sized such that it would deflect from its prescribed unstressed contour if subjected, by itself, to the pressure, temperature and humidity differentials between the first and second air spaces.

6. A transparency assembly as defined in claim 5, wherein the second transparent panel is sized such that the pressure, temperature and humidity variations between the second air space and the narrow space between the first and second panels cause the second panel to deflect from its prescribed, unstressed contour.

7. A method for using a transparency assembly of the kind that includes first and second transparent panels joined together at their peripheries and oriented such that the first panel faces a first air space and the second panel faces a second air space, the first and second panels each having a prescribed unstressed contour such that a narrow space is defined between the panels except at their peripheries, wherein pressure, temperature and humidity differentials between the first and second air spaces are subject to substantial variations, the method comprising steps of:

blowing air from the first air space into the narrow space defined between the first and second transparent panels; and conditioning the air being blown in the step of blowing such that the air in the narrow space defined between the first and second transparent panels has a pressure, temperature and humidity substantially the same as that of the first air space, whereby pressure, temperature and humidity gradients across the first panel's thickness are minimized and the first panel maintains its prescribed contour despite substantial variations in the pressure, temperature and humidity of the respective first and second air spaces.

8. A method as defined in claim 7, wherein the step of conditioning includes a step of regulating the temperature of the air being blown in the step of blowing.

9. A transparency assembly, adapted for use in an aircraft to separate an inside air space from an outside air space, wherein pressure, temperature and humidity differentials between the two air spaces are subject to substantial variations, the transparency assembly comprising:

an inner transparent panel having a substantially uniform thickness and a prescribed contour when unstressed, wherein the inner panel is sized such that it would deflect from its prescribed, unstressed contour if subjected by itself to the pressure, temperature and humidity differentials between the inside and out side air spaces;

an outer transparent panel having a substantially uniform thickness and a prescribed contour when unstressed, wherein the outer panel is sized such that it would deflect from its prescribed, unstressed contour if subjected, by itself, to the pressure, temperature and humidity differentials between the inside and outside air spaces;

means for joining together the inner and outer transparent panels at their peripheries and for orienting the joined panels such that the inner panel faces the inside air space and the outer panel faces the out side air space, wherein the contours of the inner and outer panels are selected such that a narrow space is defined between the panels, except at their peripheries; and means for blowing air from the inside air space into the narrow space defined between the inner and outer transparent panels and for conditioning the air being blown such that the air in the narrow space has a pressure, temperature, and humidity substantially the same as that of the inside air space, whereby pressure, temperature and humidity gradients across the inside panel's thickness are minimized and the inside panel maintains its prescribed contour despite substantial variations in the pressure, temperature and humidity of the respective inside and outside air spaces.

10. A transparency assembly adapted for use in separating a first air space from a second air space, wherein a pressure differential between the first and second air spaces is subject to substantial variation, the transparency assembly comprising:

- a first transparent panel having a prescribed contour when unstressed;
- a second transparent panel having a prescribed contour when unstressed;
- means for joining together the first and second transparent panels at their peripheries and for orienting the joined panels such that first panel faces a first air space and the second panel faces a second air space, wherein the contours of the first and second panels are selected such that a narrow space is defined between the panels, except at their peripheries; and
- flexible bladder means located in the first air space and having an interior space that communicates with the narrow space between the first and second transparent panels, the combined interior space and narrow space being sealed from the first and second spaces, whereby the pressure gradient across the first panel is minimized and the first panel maintains its prescribed contour despite substantial variations in the pressures of the respective first and second air spaces.

11. A transparency assembly as defined in claim 10, wherein the first transparent panel is substantially planar and has a substantially uniform thickness across substantially its entire surface.

12. A transparency assembly as defined in claim 10, wherein the first transparent panel is sized such that it would deflect from its prescribed unstressed contour if subjected, by itself, to the pressure differential between the first and second air spaces.

13. A transparency assembly as defined in claim 12, wherein the second transparent panel is sized such that the pressure variation between the second air space and the narrow space between the first and second panels causes the second panel to deflect from its prescribed, unstressed contour.

14. A transparency assembly as defined in claim 10, wherein the interior space of the bladder and the narrow space between the first and second transparent panels contain a dry air or gas.

15. A transparency assembly as defined in claim 10, wherein:
- the first transparent panel is substantially moisture impervious; and
- the first transparent panel has a thermal conductivity sufficiently high that the temperatures of the first air space and the narrow space between the first and second panels are substantially the same.

16. A transparency assembly as defined in claim 10, wherein:
- the first transparent panel is formed of a material that exhibits only insubstantial swelling upon absorption of moisture; and
- the first transparent panel has a thermal conductivity sufficiently high that the temperatures of the first air space and the narrow space between the first and second panels are substantially the same.

* * * * *